March 9, 1937. H. K. BERGHOLM 2,073,091
ABSORPTION REFRIGERATING SYSTEM
Filed April 11, 1933 2 Sheets-Sheet 1

INVENTOR.
Harry K. Bergholm
BY
ATTORNEY.

March 9, 1937. H. K. BERGHOLM 2,073,091
ABSORPTION REFRIGERATING SYSTEM
Filed April 11, 1933    2 Sheets-Sheet 2

INVENTOR.
Harry K. Bergholm
BY
Dowell.
ATTORNEY.

Patented Mar. 9, 1937

2,073,091

UNITED STATES PATENT OFFICE 2,073,091

ABSORPTION REFRIGERATING SYSTEM

Harry K. Bergholm, Larchmont, N. Y., assignor, by mesne assignments, to Servel, Inc., Dover, Del., a corporation of Delaware Application April 11, 1933, Serial No. 665,501

10 Claims. (Cl. 62—119.5)

This invention relates to absorption refrigeration systems and more particularly to a rectifier for air cooled systems of the pressure equalized type.

It is an object of this invention to provide an air cooled rectifier operative without decrease in efficiency throughout the range of room temperature and heat input. The invention will be more fully understood by reference to the following description taken in connection with the accompanying drawings, in which, Fig. 1 shows diagrammatically an air cooled absorption refrigeration system provided with a rectifier embodying the invention;

Figures 1, 2:
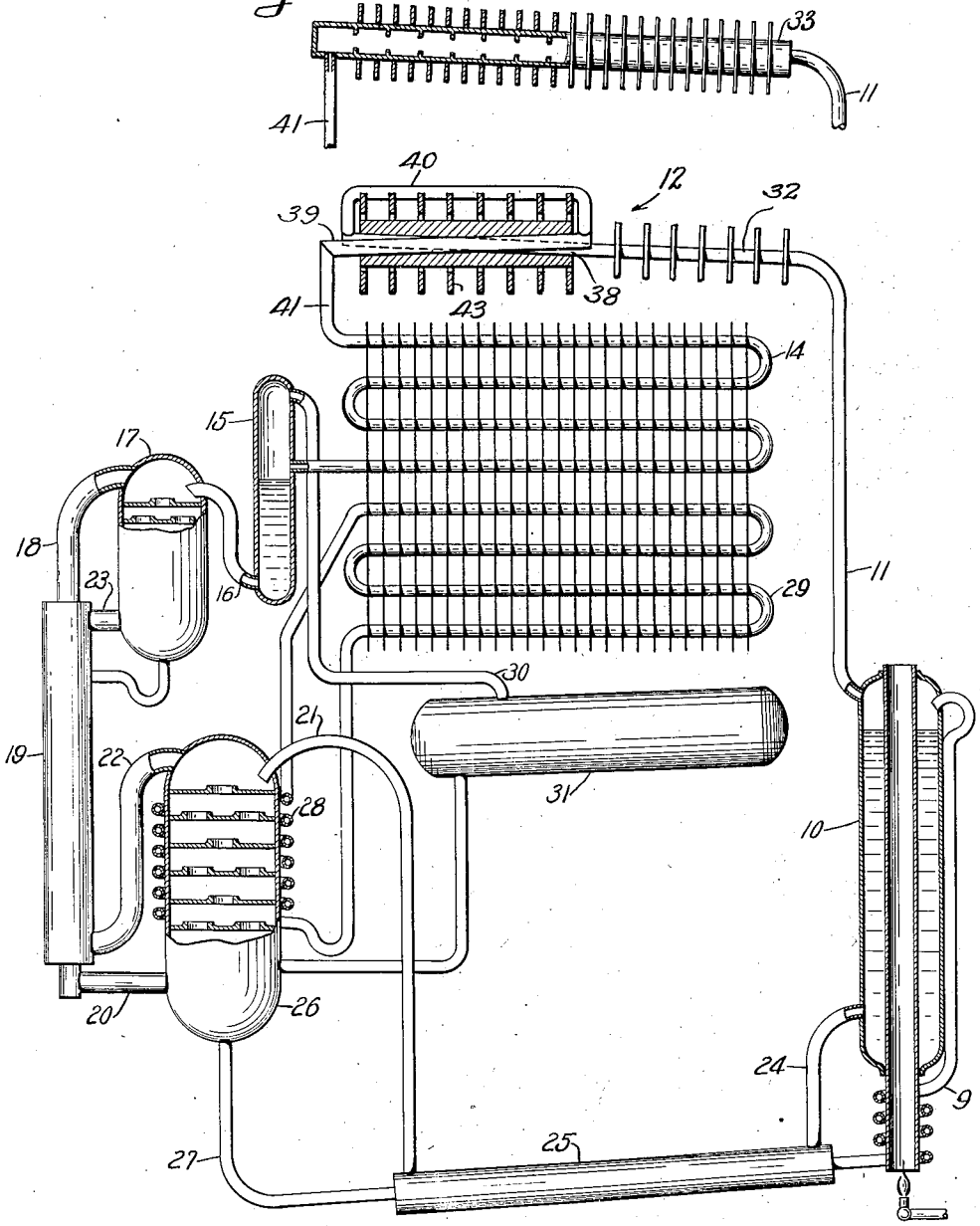
Fig. 2 shows diagrammatically a known rectifier for comparison with that shown in Fig. 1.
Figure 4:
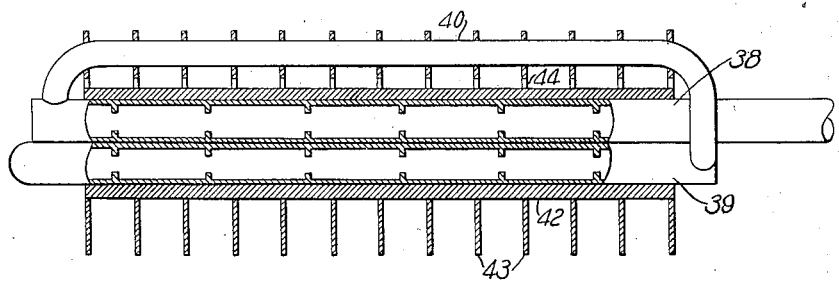
Fig. 4 is a top view, partly in horizontal section, of the part shown in Fig. 3.
Figure 3:
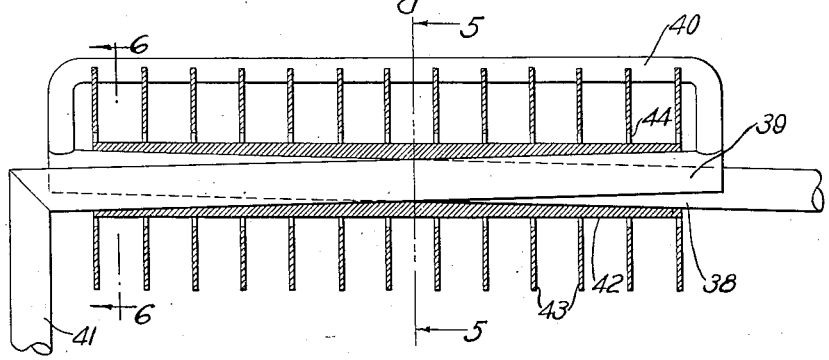
Fig. 3 is an enlarged side elevation, partly broken away, of a part of the rectifier similarly shown in Fig. 1.

Referring to Fig. 1 of the drawings, the operation of the system illustrated is briefly as follows: In the generator 10, ammonia vapor is expelled by heat from a water solution contained therein, the vapor passing through conduit 11 to a rectifier 12 provided with fins for air cooling. In the rectifier, water vapor is condensed out of the ammonia and drains back through conduit 11 into the generator. The ammonia vapor passes from the rectifier through a conduit 41 into an air cooled condenser 14 where it is liquefied, the liquid ammonia draining into a vessel 15. From the lower part of the latter the liquid ammonia overflows through conduit 16 into the evaporator 17 where it evaporates by diffusion into hydrogen which, for purposes of this description, is used as the pressure equalizing auxiliary gas. The resulting gas mixture flows from the evaporator through conduit 18, gas heat exchanger 19, and conduit 20 into the absorber 26 where the ammonia is absorbed out of the mixture into weak solution which enters through conduit 21. The weak gas returns from the absorber to the evaporator through conduit 22, gas heat exchanger 19, and conduit 23.

Weak absorption liquid overflows from the generator 10 through conduit 24, heat exchanger 25, and conduit 21 into the absorber, and the resulting enriched absorption liquid accumulates in the lower part of the absorber 26 from where it flows through conduit 27, liquid heat exchanger 25, and a thermosyphon 9 back to the generator 10.

The absorber 26 is cooled by a secondary system comprising a cooling coil 28 around the absorber and a condenser 29 interconnected to form a closed circuit adapted to contain a suitable cooling fluid, such as methyl chloride, which evaporates in the coil 28 and liquefies in the condenser 29, thus providing a vaporization-condensation cycle for transferring heat from the absorber to the air.

The condenser 14 is vented to the gas circuit for return of trapped hydrogen by a conduit 30 connected from the upper part of vessel 15 to the absorber 26 and provided with an enlarged chamber which may be referred to as a pressure vessel 31. The latter provides storage space for auxiliary hydrogen which is displaced into the gas circuit between the absorber and evaporator at high air temperatures, thereby increasing the total pressure in the system so that the latter varies in accordance with the room temperature.

For the purpose of better explaining the present invention, let it be assumed, for the present, that a known rectifier 33, as illustrated in Fig. 2, is connected in the above described system in place of the improved rectifier 12. The rectifier 33 is of such length that all the water vapor is condensed out of the ammonia before the latter enters the condenser 14 when the system is operating with maximum input at maximum room temperature. If the rectifier should be too short, some water vapor will pass into the condenser and evaporator, involving a heat loss or reduction in the refrigerating effect. If the system is operating with low heat input at low room temperature, all the water vapor will have been condensed out of the ammonia in the first part of the rectifier. At minimum room temperature with minimum heat input, all of the water vapor may be condensed in the first half of the rectifier and in the remaining length of the rectifier ammonia vapor will condense, the liquid draining back to the generator through conduit 11, thus decreasing the efficiency of the system.

In accordance with this invention, however, a rectifier is arranged as shown in Fig. 1. The first part 32 of the rectifier is so dimensioned that at minimum room temperature with minimum heat input all water will be removed from the gas but no condensation of ammonia will take place. The second part 38 of the rectifier is a continuation of part 32 but is not directly provided with heat radiating fins. Alongside of part 38 and in good thermal conductive relation therewith is arranged a section 39 provided with heat radiating fins 43. The opposite ends of parts 38 and 39 are connected by a conduit 40 and the other end of part 39 is connected to the condenser 14 by means of conduit 41.

Figure 5:
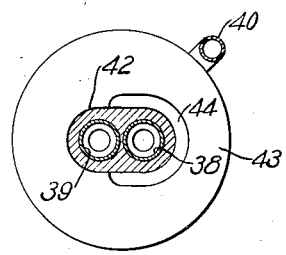
Fig. 5 is a section taken on line 5—5 in Fig. 3.
Figure 6:
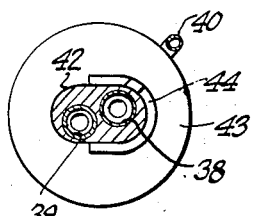
Fig. 6 is a section taken on line 6—6 in Fig. 3.

Figs. 3 to 6 better show the modified portion of the rectifier. The second part 38 of the rectifier tube is cast in aluminum alongside of a tube 39 having an opposite slope as shown by the vertical section in Fig. 3. The aluminum casting 42 is provided with integral heat radiating fins 43. As best shown in Fig. 5, the casting 42 provides good thermal conduction between the tubes 38 and 39 but the heat radiating fins 43 extend only from that portion of the casting around the tube 39, leaving openings 44 around that portion of the casting 42 in which is embedded the end 38 of the rectifier tube.

With this arrangement, heat from the rectifier section 38 must pass through the section 39 before radiation from the fins 43 and it will be obvious that there must be a temperature drop from the rectifier section 38 to section 39. The section 38 will therefore always remain at a temperature above the condensation temperature of ammonia on account of the thermal conductive relation with section 39 which, as soon as it is cooled low enough, functions as a condenser and may be considered as the first part of the condenser 14. Thus, all of the water vapor will be removed from the ammonia at maximum room temperature with maximum heat input but at minimum temperature with low heat input no ammonia will be condensed where it can drain back to the generator.

It will be obvious to those skilled in the art that various other changes may be made in the construction and arrangement without departing from the spirit of the invention and therefore the invention is not limited to what is shown in the drawings and described in the specification but only as indicated in the following claims.

I claim:

1. In an absorption refrigeration system, a generator, a condenser, a looped conduit for vapor from said generator to said condenser having portions on opposite sides of the loop in thermal exchange relation and arranged for flow of liquid in opposite directions in said conduit, heat radiation means directly associated with only one of said portions, and heat radiation fins for air cooling of said conduit between said generator and said portions in thermal exchange relation.

2. In an absorption refrigeration system, a generator, a condenser, a looped conduit for vapor from said generator to said condenser, a body of metal embedding portions of said conduit on opposite sides of the loop, said portions being arranged for flow of liquid in opposite directions in said conduit, heat radiation means for air cooling of said metal body adjacent said portion arranged for flow of liquid in the direction of said condenser and remote from said other portion, and heat radiation fins on said conduit between said generator and said embedded portions.

3. In an absorption refrigeration system, a generator, a condenser, a conduit for vapor from said generator to said condenser and having portions arranged for flow of liquid in opposite directions in the conduit, heat radiation means, and means for transferring heat from one of said portions to said radiation means in a thermal path including the other of said portions.

4. In an absorption refrigeration system, a generator, a condenser, a rectifier connected between said generator and said condenser, said rectifier having one part arranged for flow of liquid toward said generator and another part arranged for flow of liquid toward said condenser, and means for conducting heat from said first part to a cooling medium in a thermal path including said second part.

5. In an absorption refrigeration system, a generator, a rectifier connected to receive vapor from said generator and having portions arranged for flow of liquid in opposite directions, and means for conducting heat from one of said portions in a thermal path including another of said portions.

6. In an absorption refrigeration system, a generator, a condenser, a rectifier connected between said generator and condenser, said rectifier having portions in thermal exchange relation and arranged for flow of liquid in opposite directions, and heat radiation means directly associated with only one of said portions.

7. In a method of refrigeration which includes expulsion of refrigerant vapor from solution in an absorption liquid and condensation of expelled vapor to liquid, that improvement which consists in rectifying expelled vapor by transfer of heat therefrom to a cooling medium and interposing heat of said condensation in a thermal path of flow from the vapor to the cooling medium only responsive to decrease in temperature of the cooling medium.

8. In an absorption refrigeration system, a generator, a first conduit connected to receive vapor from said generator and provided with heat radiation surface for air cooling, a second conduit connected to receive vapor from said first conduit, a third conduit connected to conduct vapor from said second conduit to said condenser, means providing a further heat radiation surface for air cooling, and means for transferring heat by conduction from said second conduit to said further heat radiation surface in a thermal path including at least a part of said third conduit.

9. In a method of refrigeration which includes expulsion of refrigerant vapor from solution in an absorption liquid, that improvement which consists in rectifying expelled vapor by conducting the expelled vapor in thermal exchange relation with a cooling medium, condensing the rectified vapor, and controlling said rectification by interposing heat of condensation in the thermal path to said cooling medium from vapor undergoing rectification only responsive to decrease in temperature of the cooling medium.

10. In a method of refrigeration which includes expulsion of refrigerant vapor from solution in an absorption liquid, condensation of the expelled vapor to liquid, and evaporation of the condensed liquid, that improvement which consists in normally rectifying the expelled vapor before condensation by transferring heat therefrom by conduction and radiation to air whereby vapor of the absorption liquid is condensed, and preventing condensation of expelled refrigerant vapor during the process of rectification by utilizing heat of condensation after rectification to control transfer of heat of rectification to the air responsive to temperature of the latter.

HARRY K. BERGHOLM.